(12) United States Patent
Mukherjee et al.

(10) Patent No.: US 10,277,897 B1
(45) Date of Patent: Apr. 30, 2019

(54) SIGNALING IN-LOOP RESTORATION FILTERS FOR VIDEO CODING

(71) Applicant: GOOGLE LLC, Mountain View, CA (US)

(72) Inventors: Debargha Mukherjee, Cupertino, CA (US); Aamir Anis, Los Angeles, CA (US); Yue Chen, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 67 days.

(21) Appl. No.: 15/397,083

(22) Filed: Jan. 3, 2017

(51) Int. Cl.
| | | |
|---|---|---|
| *H04N 7/12* | (2006.01) |
| *H04N 11/02* | (2006.01) |
| *H04N 11/04* | (2006.01) |
| *H04N 19/117* | (2014.01) |
| *H04N 19/172* | (2014.01) |
| *H04N 19/184* | (2014.01) |
| *H04N 19/182* | (2014.01) |

(52) U.S. Cl.
CPC ......... *H04N 19/117* (2014.11); *H04N 19/172* (2014.11); *H04N 19/182* (2014.11); *H04N 19/184* (2014.11)

(58) Field of Classification Search
CPC .... H04N 19/117; H04N 19/82; H04N 19/184; H04N 19/615
USPC .................................................... 375/240.29
See application file for complete search history.

(56) References Cited

U.S. PATENT DOCUMENTS

| | | | |
|---|---|---|---|
| 8,208,564 B2 | 6/2012 | Bossen et al. | |
| 8,625,681 B2 | 1/2014 | Xu et al. | |
| 9,094,658 B2 | 7/2015 | Fu et al. | |
| 9,282,314 B2 | 3/2016 | Pan et al. | |
| 2002/0136311 A1* | 9/2002 | Bourge | H04N 19/80 375/240.26 |
| 2004/0264580 A1* | 12/2004 | Chiang Wei Yin | H04N 19/176 375/240.25 |
| 2012/0082241 A1 | 4/2012 | Tsai et al. | |
| 2012/0189064 A1 | 7/2012 | Kossentini et al. | |
| 2014/0003496 A1* | 1/2014 | Kondow | H04N 19/00066 375/240.02 |
| 2014/0362911 A1 | 12/2014 | Puri | |
| 2015/0043649 A1* | 2/2015 | Yie | H04N 19/176 375/240.16 |

FOREIGN PATENT DOCUMENTS

| | | |
|---|---|---|
| EP | 1841230 A1 | 10/2007 |
| EP | 2296380 A1 | 3/2011 |

OTHER PUBLICATIONS

Bankoski, et al., "Technical Overview of VP8, An Open Source Video Codec for the Web", Jul. 11, 2011, 6 pp.

(Continued)

*Primary Examiner* — Jared Walker
(74) *Attorney, Agent, or Firm* — Young Basile Hanlon & MacFarlane, P.C.

(57) ABSTRACT

Filtering for a reconstructed frame is described. An initial reconstructed frame is determined from an encoded video bitstream, a subset of filter parameters is decoded from the encoded video bitstream for the initial reconstructed frame, a filter set is determined from the subset of filter parameters based on a relationship between the filter set and the subset of filter parameters, and a final reconstructed frame is generated by applying at least one filter from the filter set to the initial reconstructed frame.

17 Claims, 9 Drawing Sheets

(56) References Cited

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

_US 10,277,897 B1_

SIGNALING IN-LOOP RESTORATION FILTERS FOR VIDEO CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding using compression may be performed by breaking frames or images into blocks. A decoder may apply one or more filters to a reconstructed frame in order to remove or smooth out artifacts caused by this lossy encoding.

SUMMARY

The disclosure relates in general to video coding, and in particular to signaling restoration filters for restoration of images in video coding.

One aspect of the disclosed implementations is a method for decoding frames of a video sequence from an encoded video bitstream. The method includes determining an initial reconstructed frame from an encoded video bitstream; decoding, for the initial reconstructed frame, a subset of filter parameters from the encoded video bitstream; determining a filter set from the subset of filter parameters based on a relationship between the filter set and the subset of filter parameters; and generating a final reconstructed frame by applying at least one filter from the filter set to the initial reconstructed frame.

Another aspect of the disclosed implementations is a method for encoding frames of a video sequence. The method includes determining an initial reconstructed frame for a source frame of the video sequence; determining a filter set for filtering the initial reconstructed frame based on minimizing an error, wherein at least one filter from the filter set is estimated to minimize the error; and encoding a subset of filter parameters from the filter set into a video bitstream based on a relationship between the filter set and the subset of filter parameters.

Another aspect of the disclosed implementations is an apparatus including a non-transitory memory and a processor. The apparatus can be used for decoding frames of a video sequence from an encoded video bitstream. The processor is configured to execute instructions stored in the memory to determine an initial reconstructed frame from the encoded video bitstream; decode, for the initial reconstructed frame, a subset of filter parameters from the encoded video bitstream; determine a filter set from the subset of filter parameters based on a relationship between the filter set and the subset of filter parameters; and generate a final reconstructed frame by applying at least one filter from the filter set to the initial reconstructed frame.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

As mentioned above, compression schemes related to coding video streams may include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously-coded pixel values and those in the current block. In this way, only the residual and parameters used to generate it need be added to the bitstream instead of including the entirety of the current block. The residual may be encoded using a lossy quantization step. Decoding (i.e., reconstructing) an encoded block from such a residual results in a distortion between the original and the reconstructed block.

Post-reconstruction loop filters may be used in various ways to improve reconstructed frames distorted or degraded as a result of the encoding and decoding processes. For example, in-loop deblocking filters can be used to modify pixel values near borders between blocks to limit the visibility of those borders within the reconstructed frame. Other loop filters may be used to bring the images closer to the source images by, for example, adding offsets that are determined at the encoder to pixel values of the reconstructed frame. Those loop filters may operate in a blind setting (i.e., without access to both a source frame and its associated reconstructed frame). According to the teachings herein, access to both the source and reconstructed frames make it possible to design restoration filters and send information that guides the decoder into achieving superior restoration.

The teachings herein describe, among other things, determining and coding restoration filters for a reconstructed frame. The restoration filters can be explicitly signaled in the bitstream. The restoration filters can be used on a reconstructed frame to reduce error (such as coding artifacts). The operations can be performed in whole or in part in-loop (such as by a loop filter) or implemented as a separate stage. In one example, the restoration filters can include one or more separable, symmetric and normalized filters. In another example, the restoration filters are determined and signaled based on a classification scheme. To reduce cost, a subset of filter parameters of the restoration filters or a delta value can be signaled to the decoder in the bitstream. It is also possible to predetermine the restoration filters without signaling them in the bitstream. Restoration filters are described herein first with reference to a system in which the teachings may be incorporated.

Figure 1:
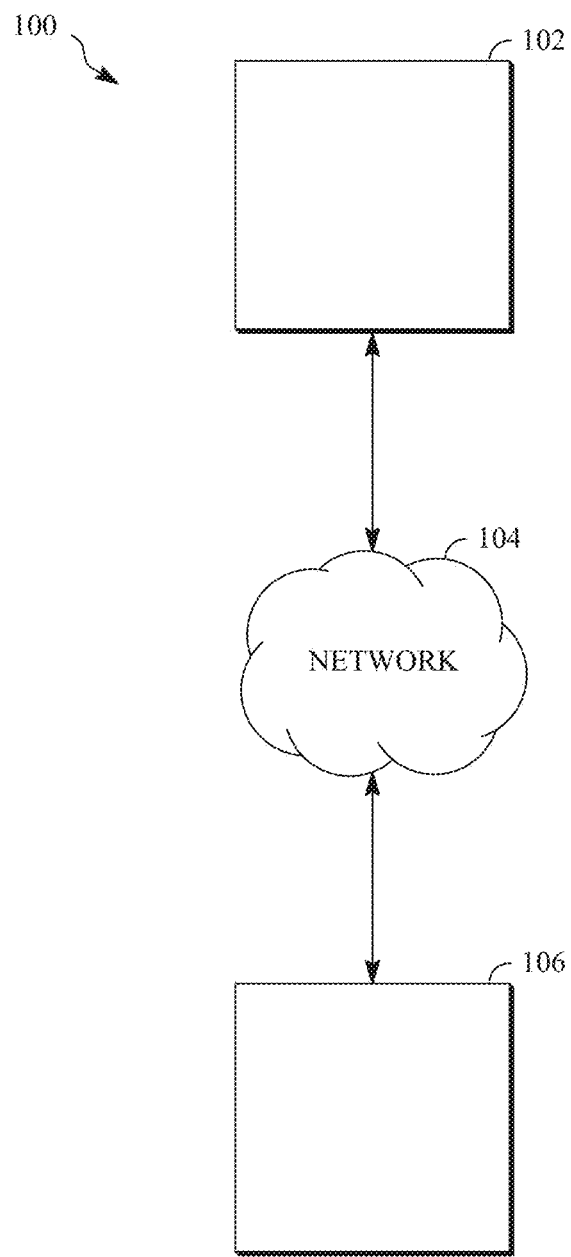
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
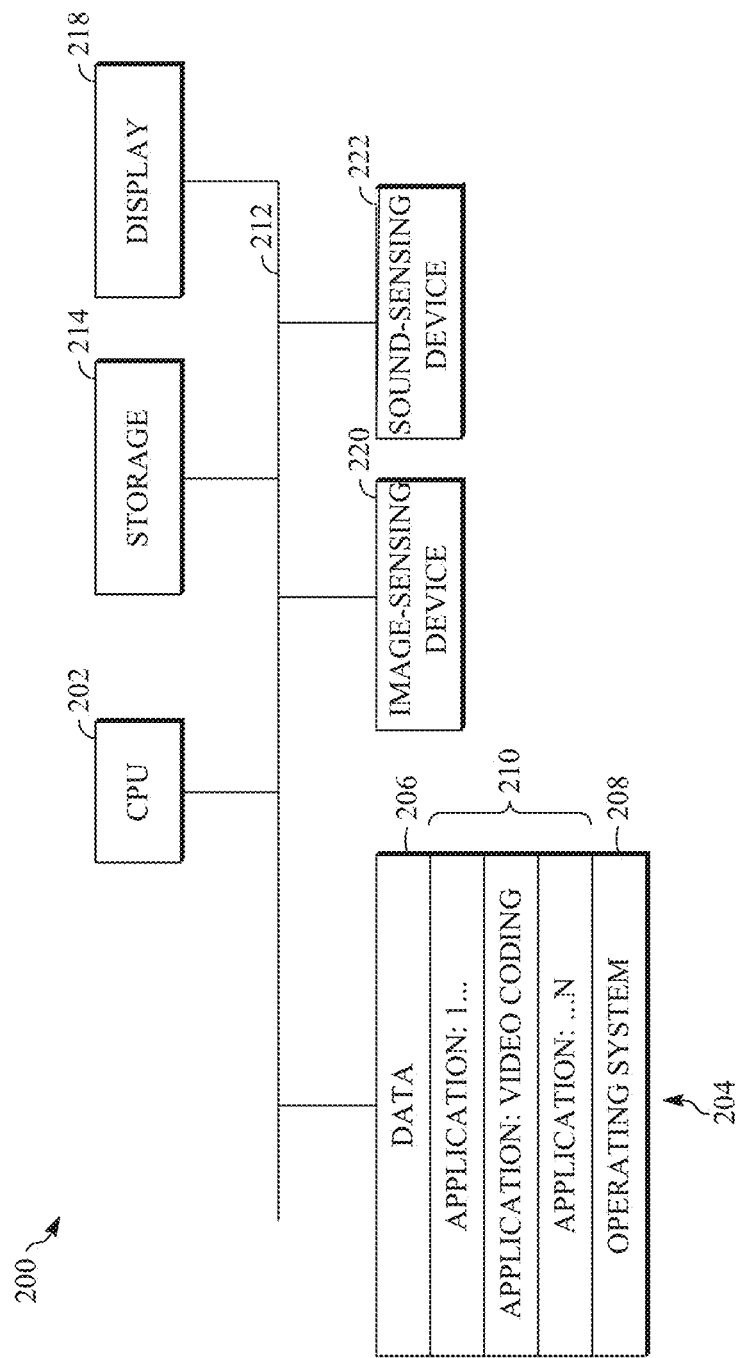
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-text transfer protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
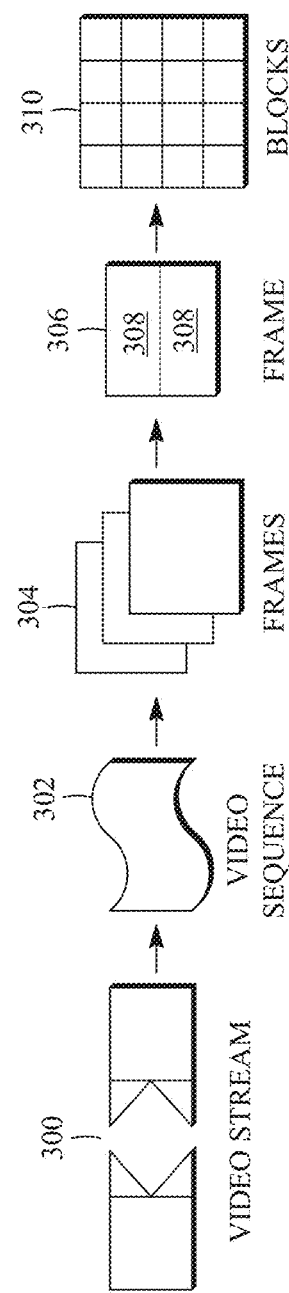
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 4:
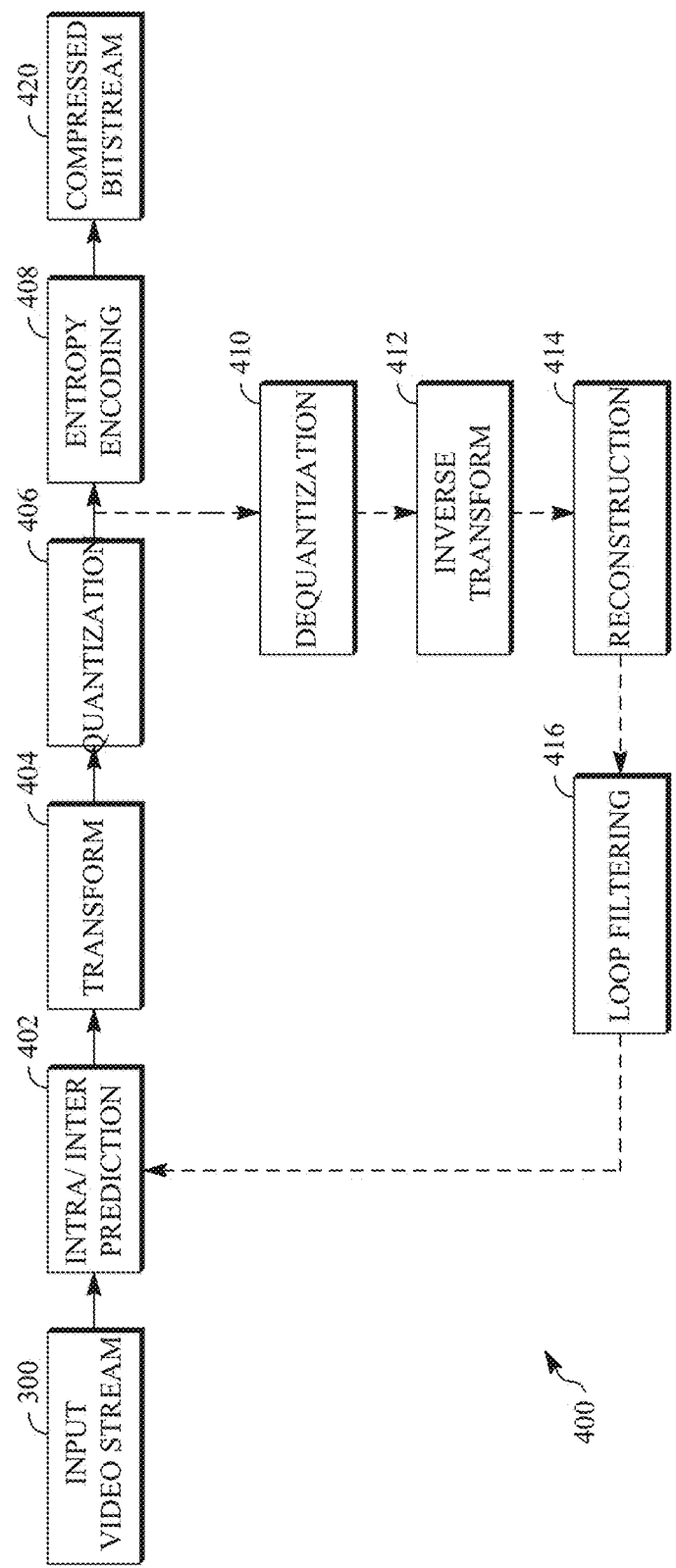
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 6, below. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage. In some implementations, a deblocking filtering stage and a restoration filtering stage (not shown) can be applied to the reconstructed block and the reconstructed frame respectively to reduce distortion and artifacts. The restoration filtering stage can include, for example, applying a restoration filter as described below in FIGS. 6-11.

Figure 5:
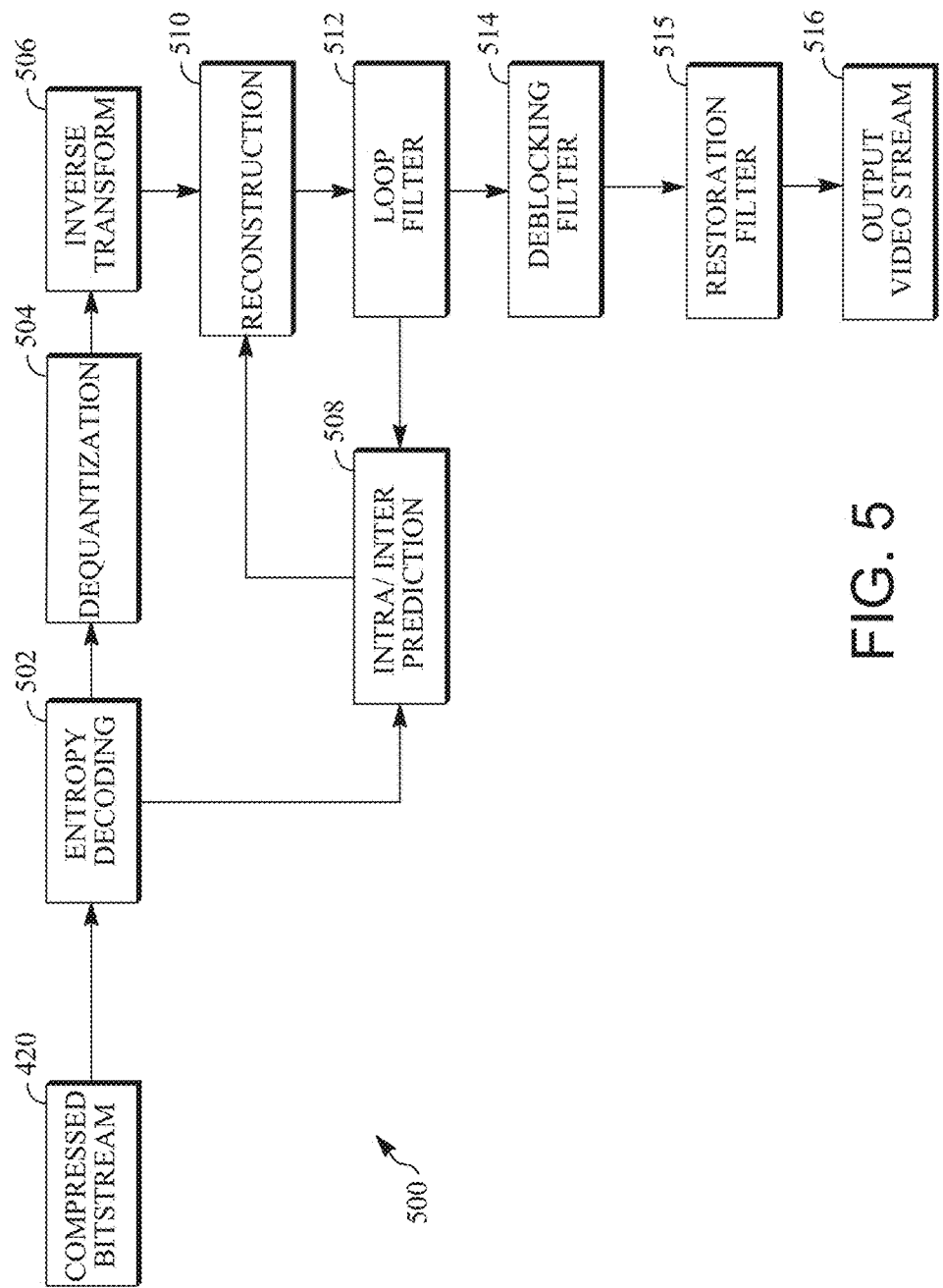
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 10 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, a deblocking filtering stage 514, and a restoration filtering stage 515. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 and the restoration filtering stage 515 are applied to the reconstructed block and the reconstructed frame respectively to reduce distortion and artifacts, and the result is output as an output video stream 516. The restoration filtering stage 515 can include, for example, applying a restoration filter as described below in FIGS. 6-11. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. In some implementations, the restoration filtering stage 515 is applied before the deblocking filtering stage 514. Additionally or alternatively, the encoder 400 can include a deblocking filtering stage in place of or in addition to the loop filtering stage 416.

Figure 6:
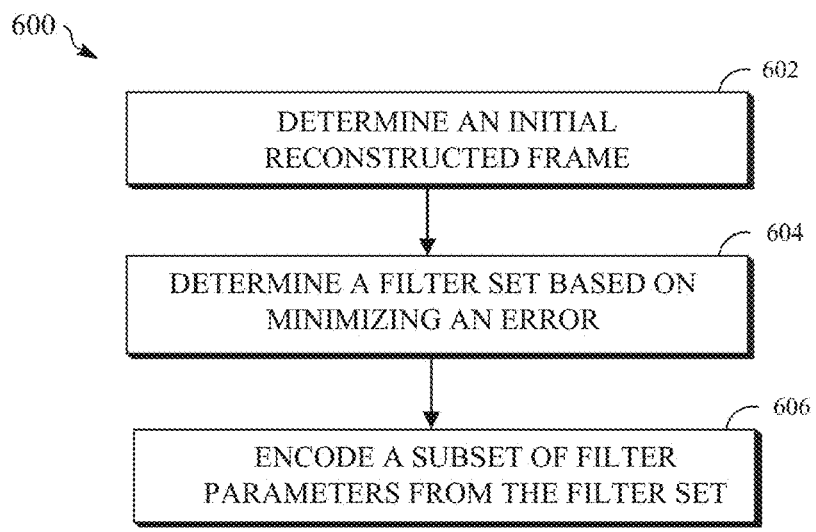
FIG. 6 is a flowchart diagram of a process for encoding restoration filters for a reconstructed frame according to implementations of this disclosure.

FIG. 6 is a flowchart diagram of a process 600 for encoding restoration filters for a reconstructed frame according to implementations of this disclosure. As explained above, the restoration filters can be used on a reconstructed frame to reduce error (such as coding artifacts). The restoration filters can be explicitly signaled in the video bitstream. For example, the restoration filters can include one or more separable, symmetric and normalized filters, as discussed below. The process 600 can be implemented in an encoder such as the encoder 400 and can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the loop filtering stage 416 of the encoder 400. The process 600 can also be implemented as a separate process (e.g., at the restoration filtering stage) after the loop filtering stage 416.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 602, an initial reconstructed frame is determined. The initial reconstructed frame can be determined using the reconstruction path in an encoder such as the encoder 400. For example, the encoder can decode the coding modes, motion vectors, and various coefficients from the encoded video bitstream 420. Using various stages described above, such as the dequantization stage 410, the inverse transform stage 412, intra/inter prediction stage 402, the initial reconstructed frame can be determined at the reconstruction stage 414 by adding the derivative residuals to the prediction blocks. Optionally, filtering operations such as the loop filtering stage 416, a deblocking filtering stage (not shown), or both, can be used to reduce artifacts from the initial reconstructed frame.

At 604, a filter set is determined based on minimizing an error. The filter set can be determined for (filtering) the initial reconstructed frame by estimating at least one filter from the filter set to minimize the error. The estimation of the filters in the filter set can proceed as an iterative process, as will be discussed below in FIG. 7.

The error that is used to determine the filter set can be, for example, a mean square error (MSE). The error may be determined by a comparison between pixels of the source frame and pixels of a reconstructed frame. For example, the error can be calculated using differences between values of reconstructed pixels in the reconstructed frame and values of corresponding (i.e., co-located) pixels in the source frame. An estimation process, such as a linear minimum mean square error (LMMSE) process, can be used to estimate the parameters of a filter, such as a horizontal or a vertical filter. Parameters of the filter, also referred to as filter parameters, can include filter coefficients. For example, a 5-tap filter includes filter parameters that can be represented by five coefficients. Sometimes, such as when the filter is symmetric, fewer than five coefficients are needed to represent the 5-tap filter, as shown in the examples below.

In some implementations, the at least one filter can be a separable, symmetric and normalized filter. The at least one filter can be a Wiener filter. Other types of filters can also be used. The filter set can include, for example, horizontal and vertical filters. In some implementations, the filter set includes a horizontal filter and a vertical filter, jointly referred to as a filter pair. Either or both of the filter pair can be, for example, a separable, symmetric and normalized Wiener filter.

Figure 7:
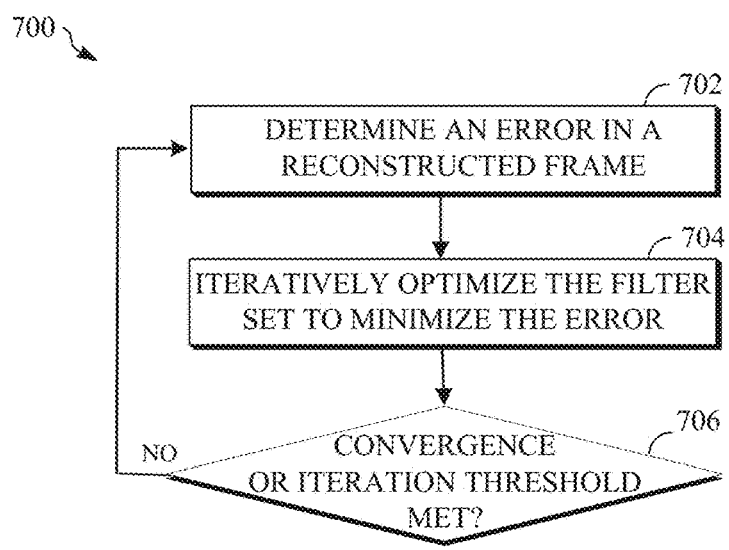
FIG. 7 is a flowchart diagram of a process for determining a filter set according to an implementation of this disclosure.

The estimation process can be performed iteratively. FIG. 7 is a flowchart diagram of a process 700 for determining the filter set in an implementation of this disclosure. The process 700 can be used to iteratively determine of the filter set at 604.

At 702, an error (such as MSE) is determined for a reconstructed frame. As previously discussed, the error can be determined as a difference between the reconstructed frame and the source frame. The reconstructed frame can be, for example, a subsequent reconstructed frame by applying a currently estimated filter set to the initial reconstruction frame.

At 704, one of the at least one filter and at least another filter from the filter set can be iteratively optimized to minimize the error. The process 700 can iteratively optimize the filter set by estimating one filter each time to minimize the error, while keeping the other filters in the filter set unchanged. In the next iteration, a different filter can be estimated, and so on.

At 706, it is determined whether a convergence criterion on the error has been met or that the number of iterations has reached a predetermined threshold. If neither condition is met, process 700 goes back to 702 for the next iteration. If either condition is met, process 700 completes the determination of the filter set.

In some implementations, the process 700 can iteratively optimize the filter pair including the horizontal filter and the vertical filter. For example, the horizontal filter can be estimated while the vertical filter is unchanged. In the next round, the vertical filter can be estimated while the horizontal filter that has been estimated is unchanged. The iteration can continue until a certain number of iterations have been completed, or when convergence in the error is found.

Referring again to FIG. 6, at 606, the process 600 encodes a subset of filter parameters from the filter set into a video bitstream. The video bitstream can be compressed bitstream 420, for example. The subset of filter parameters can be selected based on a relationship between the filter set and the subset of filter parameters. For example, when at least one filter from the filter set is a separable, symmetric and normalized filter, process 600 can substantially reduce the number of bits used for indicating the filter set by signally a subset of the filter parameters. In this example, the filter set can be derived from the subset of the filter parameter, or vice versa, based on the symmetric and normalized relationship of the coefficients.

Figure 11:
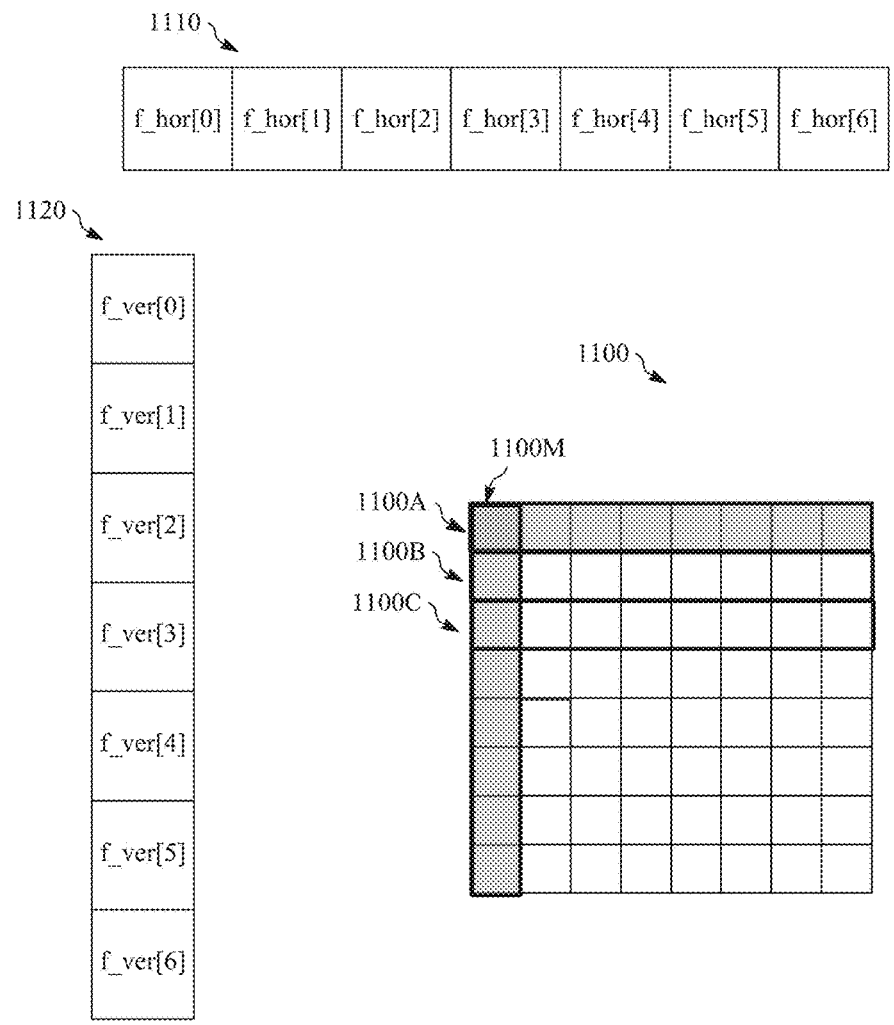
FIG. 11 is a diagram of an example video frame and an example filter set.

FIG. 11 depicts an 8×8 block 1100 in a reconstructed frame output from, e.g., the reconstruction stage 414 and an example filter set. The filter set has two filters, a horizontal filter 1110 and a vertical filter 1120. By way of example, and without limitation, each filter is a separable, symmetric and normalized 7-tap filter. The horizontal filter 1110 applies in the horizontal direction, and the filter parameters are denoted f_hor[0], f_hor[1], . . . , f_hor[6]. The vertical filter 1120 applies in the vertical direction, and the filter parameters are denoted f_ver[0], f_ver[1], . . . , f_ver[6]. The horizontal filter 1110 can be applied to each row of block 1100, such as row 1100A, 1100B, 1100C . . . as shown in FIG. 11. Similarly, the vertical filter 1120 can be applied to each column of block 1100, such as column 1100M and so on.

In this example, the horizontal filter 1110 and the vertical filter 1120 are each separable, symmetric and normalized. According to the symmetric constraint for a separable, symmetric and normalized filter, f_hor[0]=f_hor[6], f_hor[1]=f_hor[5], f_hor[2]=f_hor[4]. Likewise, for the vertical filter 1120, f_ver[0]=f_ver[6], f_ver[1]=f_ver[5], f_ver[2]=f_ver[4].

Additionally, according to the normalized constraint for the horizontal filter 1110, f_hor[0]+f_hor[1]+f_hor[2]+f_hor[3]+f_hor[4]+f_hor[5]+f_hor[6]=1. Likewise, for the vertical filter 1120, f_ver[0]+f_ver[1]+f_ver[2]+f_ver[3]+f_ver[4]+f_ver[5]+f_ver[6]=1.

Based on certain properties associated with a filter, a subset of the filter parameters can be encoded for that filter and sent in the video bitstream. For example, based on the symmetric and normalized constraints described above, an encoder, such as the encoder 400 implementing the process 600, can choose to send three of all seven filter parameters for the horizontal filter 1110 or the vertical filter 1120. For example, the encoder 400 can encode a subset of filter parameters, such as f_hor[0], f_hor[1] and f_hor[2], into the video bitstream for signaling to a decoder, such as the decoder 500. The subset of filter parameters, such as f_hor[0], f_hor[1] and f_hor[2], is sufficient to specify the horizontal filter 1110 based on the symmetric and normalized constraints of the horizontal filter 1110. Likewise, the encoder 400 can encode f_ver[0], f_ver[1] and f_ver[2] into the video bitstream to specify the vertical filter 1120. More generally, when the at least one filter is a K-tap symmetric and normalized filter, the subset of filter parameters for that filter can include (K−1)/2 filter coefficients. The type and properties of restoration filters that are being signaled, such as the use of separable, symmetric and normalized filters, can be communicated to the decoder ahead of time, or understood by the decoder as part of the coding scheme.

Back to the example of FIG. 11, the filter coefficients of a 7-tap filter, such as the horizontal filter 1110 or the vertical filter 1120, can be integerized to sum to a value of $2^7$=128. In this context, a certain number of bits are allocated to convey the subset of filter parameters, such as f_hor[0], f_hor[1] and f_hor[2] for the horizontal filter 1110. In one example, four bits can be allocated to filter parameter f_hor[0], representing a range of values in [−5, 10]. Similarly, five bits can be allocated to f_hor[1], representing a range of values in [−23, 8]. Six bits can be allocated to f_hor[2] to cover the range [−20, 43]. Bits can be similarly allocated for the vertical filter 1120. In this example, a total of 4+5+6=15 bits are needed for each filter. Overall, thirty bits are needed for transmitting the filter pair including the horizontal filter 1110 and the vertical filter 1120.

The above mechanism can be readily combined with a classification process. In some implementations, at least some pixels of the reconstructed frame can be classified into one or more classes. The classification can be performed for individual pixels, or for segmentations such as blocks, slices or tiles.

For example, some or all of the pixels of a reconstructed frame can be classified into classes. Not all pixels of the frame must be classified into classes. In some implementations, only some pixels of the frame are classified. For example, pixels of a frame may be segmented into groups of pixels (such as blocks, slices or tiles), with pixels of only certain of the groups classified into classes.

In another example, segmentations of a reconstructed frame are classified into classes. The segmentations may be blocks, such as described with regard to FIG. 3, or alternatively or additionally slices, segments, a diagonal tessellation of a frame or block, or any other shape or different shapes.

The classification scheme can include multiple classes. The number of classes available for a classification scheme can be predefined such as in a configuration file. The number of classes available for a classification can also be dynamically determined, either starting from the predefined number or not, at pixel classification time. Dynamically determining the number of classes available for a classification may be based on the results of the classification scheme.

As a non-limiting example, the classification scheme can be based on one or more of edge characteristics (such as edge strength), and location within a frame. The classification scheme can also include one or more of, for example, an amplitude-based classification, a location-based classification, an edge-based classification and a spatial classification, or a combination of the above. The amplitude-based classification, for example, assigns a pixel a class based on an intensity of the pixel value. The location-based classification assigns a class to a pixel based on its value relative to the values of one or more spatially-neighboring pixels. The edge-based classification assigns a class to a pixel can be based on, for example, edge strength or the location relative to an edge, such as an indication of how close the pixel is to an edge. The edge-based classification may be defined, for example, by ranges of gradient magnitudes or other edge characteristics.

The spatial classification assigns a tile class to a pixel. A frame may be divided into tiles sharing a common width and a common height. The width and the height may be the same, or the width and the height may be different. The tiles may correspond, in whole or in part, to blocks. Tiles at the bottom edge, the right edges, or both, can have smaller or bigger sizes than the rest of the tiles. The number of classes of the spatial classification can be equal to or less than the number of tiles of the frame. A pixel may be assigned a tile class based on in which tile the pixel is located. Other classification schemes that include other classifications may be used. Assigning the pixels using some, and not all, of the classes may be used.

Figure 9:
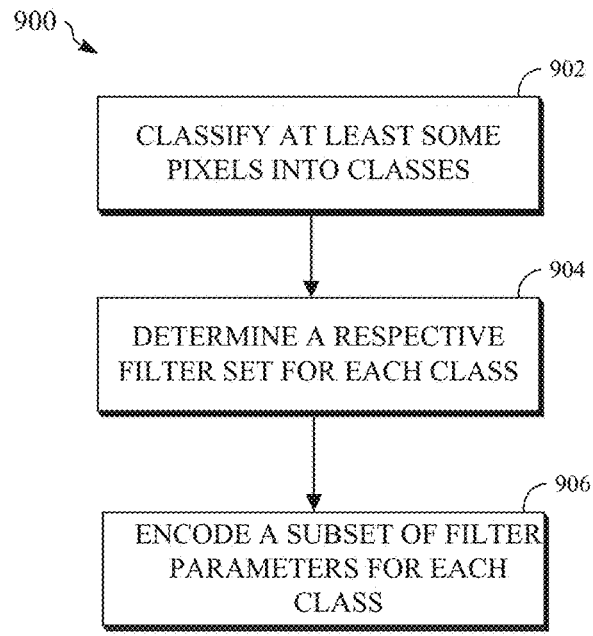
FIG. 9 is a flowchart diagram of a process for encoding classification-based restoration filters according to an implementation of this disclosure.

FIG. 9 is a flowchart diagram of a process 900 for encoding classification-based restoration filters according to an implementation of this disclosure. As described above, classification-based filtering can be used to reduce error in a reconstructed frame. In the implementations that use classification schemes, classification parameters can be extracted from the received encoded video bitstream 420. In some implementations, an encoder, such as the encoder 400, and a decoder, such as the decoder 500, can have a same classifier system. A classifier system can be a module, or a set of instructions, which classifies the pixels of a reconstructed frame, based on a classification scheme. The classification parameters can be classification parameters encoded by an encoder, such as the encoder 400 executing the process 900. The classification parameters are used to generate classes for assignment of pixels. The classification parameters can also be known to both the encoder 400 and the decoder 500, such as when the classes are predetermined under some classification schemes, which makes signaling of classification parameters unnecessary or optional.

At 902, at least some pixels of the initial reconstructed frame are classified into classes according to a classification scheme. As a result, a classified pixel is associated with one of the classes. As discussed above, individual pixels or segmentations of the initial reconstructed frame can be classified according to the classification scheme. The classification scheme can be based on one or more of edge characteristics (such as edge strength), location within a frame, and other information associated with the initial reconstructed frame.

At 904, a respective filter set for filtering the initial reconstructed frame is determined for each class. The respective filter set can be determined similar to that described with regard to process 600 at 604 based on minimizing an error. An error can be determined for each class ("class error"), and a respective filter set can be estimated to minimize the error. The comparison may be performed between the values of pixels of the reconstructed frame that are in the class and co-located pixels within the source frame. The class error can be calculated using differences between values of reconstructed pixels in the reconstructed frame of the class and values of corresponding (i.e., co-located) pixels in the source frame. The differences are combined, such as by adding them together, to obtain the class error. As described above at 604, the error that is used to determine the filter(s) can be, for example, a mean square error (MSE). An estimation process, such as a linear minimum mean square error (LMMSE) process, can be used to estimate the parameters of a filter set.

Determining the class error can be implemented at, for example, 702 in FIG. 7. If there are more classes for which a class error has not been determined at 706, the process 700 returns to 702 for consideration of the next class. Otherwise, the process 700 terminates.

At 906, a respective subset of filter parameters from the respective filter set is encoded for each class. As described above at 606 and in the example of FIG. 11, the subset of the filter parameters can be determined based on a relationship between the respective filter set and the respective subset of filter parameters, such as, for example, the separable, symmetric and normalized properties of the respective filter set. The subset of the filter parameters (and optionally the associated class information) can be encoded into the video bitstream for transmission to a decoder. The subset of filter parameters and class information may be arithmetic coded before inclusion in the bitstream.

In some implementations, the filter set (such as the filter pair) can be predetermined to further reduce the number of bits for signaling the filter parameters. When there are a large number of classes, it can be too expensive to send the subset of filter parameters explicitly. In some implementations, without explicitly transmitting information about filter parameters, the decoder can utilize the predetermined filter set for each class. The predetermined filter sets can be trained offline using, for example, real video data.

In some implementations, a combination of explicitly signaled information and predetermined information is used for signaling the filter parameters. For example, a delta value indicative of a difference from a default filter set can be encoded. In these implementations, the delta can be zero or relatively small in most scenarios, which can further reduce the number of bits transmitted.

Although not expressly shown, the parameters for each of the classes may be encoded in the bitstream at 906, which can be part of 606. In an implementation, the parameters encoded are those parameters a decoder will need to reconstruct the classes used by the encoder. The parameters may be included in a look-up table for signaling to the decoder in the bitstream, whereby the look-up table can be reproduced. For example, the parameters may include ranges of values for each class, or dimension of the tiles.

Figure 8:
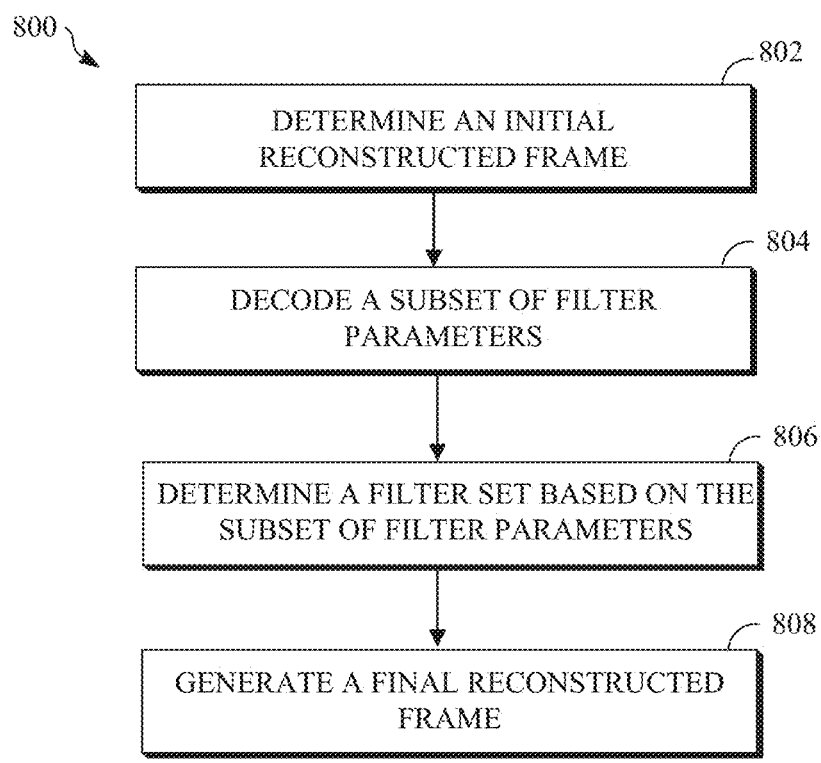
FIG. 8 is a flowchart diagram of a process for decoding restoration filters for a reconstructed frame according to implementations of this disclosure.

FIG. 8 is a flowchart diagram of a process 800 for decoding restoration filters for a reconstructed frame according to implementations of this disclosure. The process 800 may be performed by a decoder, such as the decoder 500. For example, the process 800 can be performed in whole or in part by loop filter stage 512 of the decoder 500, or by a separate stage after the loop filter stage 512, such as, for example, the restoration filtering stage 515. Implementations of the process 800 can be performed by storing instructions in a memory such as the memory 204 of the receiving station 106 to be executed by a processor such as CPU 202, for example.

The process 800 can be implemented using specialized hardware or firmware. Some computing devices can have multiple memories, multiple processors, or both. The steps or operations of the process 800 can be distributed using different processors, memories, or both. For simplicity of explanation, the process 800 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 802, an initial reconstructed frame is determined from a received encoded video bitstream. The initial reconstructed frame can be, for example, a frame resulting from reconstruction stage 510. For example, the reconstruction may be performed similar to that described with regard to the process 600 at 602.

At 804, a subset of filter parameters is decoded from the received encoded video bitstream. The subset of filter parameters can include, for example, the subset of filter parameters described in 606 of process 600. An example is shown in FIG. 11. According to this example, the subset of filter parameters can include, for example, three filter parameters for each 7-tap filter. For example, the subset of filter parameters can include f_hor[0], f_hor[1] and f_hor[2] for the horizontal filter 1110, and f_ver[0], f_ver[1] and f_ver[2] for the vertical filter 1120. Other arrangement of the subset of filter parameters can also be used. In the implementations that do not transmit the filter parameters, the filter parameters can be derived based on filter parameters that are pre-trained (or otherwise predetermined) for each class, as described above.

At 806, a filter set is determined from the subset of filter parameters based on a relationship between the filter set and the subset of filter parameters. Once the subset of filter parameters are decoded from the received encoded video bitstream, the rest of the filter parameters can be determined. In the example of FIG. 11, f_hor[3], f_hor[4], f_hor[5] and f_hor[6] can be determined from f_hor[0], f_hor[1] and f_hor[2] based on the symmetric and normalized properties of the filters. Similarly, f_ver[3] through f_ver[6] can be determined from f_ver[0], f_ver[1] and f_ver[2].

At 808, a final reconstructed frame is generated by applying the filter set. The filter set can include, for example, a filter pair including a horizontal filter and a vertical filter, as described above. The horizontal and vertical filters can be applied to the initial reconstructed frame by, for example, applying the horizontal filter to each row of the initial reconstructed frame to obtain a horizontally filtered reconstructed frame, and applying the vertical filter to each column of the horizontally filtered reconstructed frame to obtain the final reconstructed frame. It is also possible to apply the vertical filter before applying the horizontal filter, depending on the coding scheme.

Figure 10:
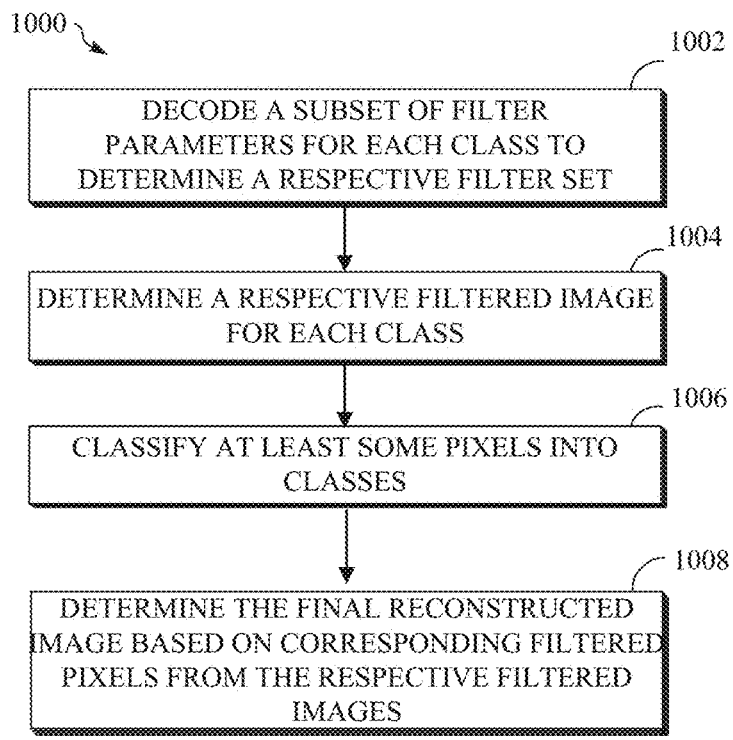
FIG. 10 is a flowchart diagram of a process for decoding classification-based restoration filters according to an implementation of this disclosure.

FIG. 10 is a flowchart diagram of a process 1000 for decoding classification-based restoration filters according to an implementation of this disclosure. In some implementations, an encoder, such as the encoder 400, and a decoder, such as the decoder 500, can have a same classifier system. A classifier system can be a module, or a set of instructions, which classifies the pixels of a reconstructed frame, based on a classification scheme as the examples described with respect to the process 900. Process 1000 may be performed on the reconstructed frame either before or after applying a deblocking filter when a deblocking filter is used. Process 1000 can be implemented as part of the process 800.

At 1002, a subset of filter parameters is decoded for each class associated with the initial reconstructed frame. A respective subset of filter parameters is determined for each class to determine a respective filter set for that class. The determination can be similar to the description above in the process 900. According to some classification schemes, classification parameters can be extracted from the received encoded video bitstream. The classification parameters can be classification parameters encoded by an encoder, such as an encoder executing the process 900 at 906. The classification parameters can be used to generate classes for assignment of pixels.

At 1004, a respective filtered image is determined for each class. The respective filtered image can be determined by applying at least one filter from the respective filter set to the initial reconstructed frame. In one implementation, a complete filtered image is determined for each class. For multiple classes, multiple filtered images are obtained. In another implementation, for each class, only a portion of the initial reconstructed frame is determined, which covers the pixels or blocks associated with that class.

At 1006, at least some pixels of an initial reconstructed frame, such as a frame resulting from reconstruction stage 510, are classified into the classes. A classified pixel is associated with a respective one of the classes. The classification can be based on characteristics of the pixels. For example, the classification may be performed similarly to that described with regard to the process 900 at 902. As described above, individual pixels or segmentations (such as blocks or tiles) of the initial reconstructed frame can be classified. 1006 can occur before or after 1004, depending on whether the classification information is needed for 1004.

At 1008, a final reconstructed image is determined using filtered images for each class. The final reconstructed frame can be determined based on a corresponding filtered pixel from the respective filtered frame for each classified pixel.

For example, for each pixel, a filtered pixel from the respective filtered image corresponding to the class assigned to that pixel can be picked for the final reconstructed image.

In some implementations, without explicitly transmitting information about filter parameters, the decoder can utilize the predetermined filter set for each class. The predetermined filter sets can be trained offline using, for example, real video data. Also, in some implementations, a delta value indicative of a difference from a default filter set can be decoded and added to the default filter set to obtain the filter set.

For simplicity of explanation, the processes 600, 700, 800, 900 and 1000 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding frames of a video sequence from an encoded video bitstream, comprising:
   determining, using a decoder, an initial reconstructed frame from an encoded video bitstream;
   decoding, for the initial reconstructed frame, a subset of filter parameters from the encoded video bitstream, a filter parameter of the subset of filter parameters corresponding to a respective filter coefficient of fewer than all filter coefficients of a filter;
   determining the filter from the subset of filter parameters based on a relationship between the filter and the subset of filter parameters;
   applying the filter to pixels of the initial reconstructed frame to obtain filtered pixels; and
   generating a final reconstructed frame using the filtered pixels, the final reconstructed frame having reduced distortion as compared to the initial reconstructed frame.

2. The method of claim 1, wherein the filter comprises a separable, symmetric and normalized filter, and the relationship between the filter and the subset of filter parameters is symmetric and normalized.

3. The method of claim 1, wherein determining the filter comprises determining a horizontal filter and a vertical filter, and applying the filter to the initial reconstructed frame comprises:
  applying the horizontal filter to at least some pixels in rows of the initial reconstructed frame to generate a horizontally filtered frame; and
  applying the vertical filter to at least some pixels columns of the horizontally filtered frame to obtain the filtered pixels.

4. The method of claim 1, wherein the filter comprises a K-tap filter, and the subset of filter parameters comprises (K−1)/2 filter coefficients.

5. The method of claim 4, wherein the filter comprises a 7-tap filter, and the subset of filter parameters comprises 3 filter coefficients.

6. The method of claim 1, wherein:
  decoding the subset of filter parameters from the encoded video bitstream comprises decoding, for each class associated with the initial reconstructed frame, a respective subset of filter parameters to determine a respective filter for the class; and
  applying the filter to at least some pixels of the initial reconstructed frame comprises determining, for each class, a respective filtered frame by applying the respective filter to the initial reconstructed frame; the method further comprising:
  classifying at least some pixels of the initial reconstructed frame into classes, wherein a classified pixel is associated with a respective one of the classes, and wherein generating the final reconstructed frame comprises:
  determining the final reconstructed frame based on a corresponding filtered pixel from the respective filtered frame for each classified pixel.

7. A method for decoding frames of a video sequence from an encoded video bitstream, comprising:
  determining an initial reconstructed frame from an encoded video bitstream;
  decoding, for the initial reconstructed frame, a subset of filter parameters from the encoded video bitstream;
  determining a filter set from the subset of filter parameters based on a relationship between the filter set and the subset of filter parameters; and
  generating a final reconstructed frame by applying at least one filter from the filter set to the initial reconstructed frame;
  decoding, for each class associated with the initial reconstructed frame, a respective subset of filter parameters to determine a respective filter set;
  determining, for each class, a respective filtered frame by applying at least one filter from the respective filter set to the initial reconstructed frame;
  classifying at least some pixels of the initial reconstructed frame into classes, wherein a classified pixel is associated with a respective one of the classes;
  determining the final reconstructed frame based on a corresponding filtered pixel from the respective filtered frame for each classified pixel;
  decoding, for at least one of the classes, a delta value indicative of a difference from a default filter set; and
  determining, for the at least one of the classes, the respective filter set based on the delta value and the default filter set.

8. An apparatus for decoding frames of a video sequence from an encoded video bitstream, the apparatus comprising:
  a non-transitory memory; and
  a processor, wherein the non-transitory memory includes instructions executable by the processor to:
  determine an initial reconstructed frame from the encoded video bitstream;
  decode, for the initial reconstructed frame, a first subset of filter parameters from the encoded video bitstream, a filter parameter of the first subset of filter parameters corresponding to a respective filter coefficient of fewer than all filter coefficients of a first filter;
  decode, for the initial reconstructed frame, a second subset of filter parameters from the encoded video bitstream, a filter parameter of the second subset of filter parameters corresponding to a respective filter coefficient of fewer than all filter coefficients of a second filter;
  determine a filter pair from the first subset of filter parameters and the second subset of filter parameters, comprising:
  determining the first filter based on a relationship between the first filter and the first subset of filter parameters; and
  determining the second filter based on a relationship between the second filter and the second subset of filter parameters;
  apply the filter pair to the initial reconstructed frame to obtain filtered pixels; and
  generate a final reconstructed frame using the filtered pixels, the final reconstructed frame having reduced distortion as compared to the initial reconstructed frame.

9. The apparatus of claim 8, wherein each of the first filter and the second filter comprises a separable, symmetric and normalized filter, each of the first filter and the second filter comprises a K-tap filter, and each of the first subset of filter parameters and the second subset of filter parameters comprises (K−1)/2 filter coefficients.

10. The apparatus of claim 8, wherein the filter pair comprises a horizontal filter and a vertical filter, and the instructions to applying the filter pair further comprise instructions executable by the processor to:
  apply the horizontal filter to at least some rows of the initial reconstructed frame to generate a horizontally filtered frame; and
  apply the vertical filter to at least some columns of the horizontally filtered frame to generate the final reconstructed frame.

11. The apparatus of claim 8, wherein the non-transitory memory further includes instructions executable by the processor to:
  decode, for each class associated with the initial reconstructed frame, a respective subset of filter parameters to determine a respective filter pair for the class;
  determine, for each class, a respective filtered frame by applying the respective filter pair to the initial reconstructed frame;
  classify at least some pixels of the initial reconstructed frame into classes, wherein a classified pixel is associated with a respective one of the classes; and
  determine the final reconstructed frame based on a corresponding filtered value from the respective filtered frame for each classified pixel.

12. The apparatus of claim 11, wherein the non-transitory memory further includes instructions executable by the processor to:
  decode, for at least one of the classes, a delta value indicative of a difference from a default filter; and determine, for the at least one of the classes, a respective filter of a filter pair based on the delta value and the default filter.

13. The apparatus of claim 8, wherein the non-transitory memory further includes instructions executable by the processor to:
    decode, for at least one pixel class associated with the initial reconstructed frame, a delta value indicative of a difference from a default filter; and
    determine, for the at least one pixel class, a respective filter based on the delta value and the default filter.

14. The apparatus of claim 8, wherein the non-transitory memory further includes instructions executable by the processor to:
    decode respective bits allocated to each filter parameter, the subset of filter parameters corresponding to the respective filter coefficients integerized to sum to a value of $2^7$.

15. The method of claim 1, wherein decoding the subset of filter parameters comprises:
    decoding respective bits allocated to each filter parameter, the subset of filter parameters corresponding to the respective filter coefficients integerized to sum to a value of $2^7$.

16. The method of claim 1, wherein:
    the subset of filter parameters comprises first filter parameters for a first filter of a filter pair, and second filter parameters for a second filter of a filter pair;
    determining the filter comprises determining the first filter based on a relationship between the first filter and the first filter parameters and determining the second filter based on a relationship between the second filter and the second filter parameters, and
    applying the filter comprises applying the filter pair to pixels of the initial reconstructed frame to obtain the filtered pixels.

17. The method of claim 1, wherein:
    decoding the subset of filter parameters from the encoded video bitstream comprises decoding, for each class of multiple classes associated with the initial reconstructed frame, a respective subset of filter parameters, each respective subset of filter parameters corresponding to a respective filter coefficient of a subset of fewer than all filter coefficients of a filter for the class; and
    determining the filter from the subset of filter parameters comprises determining, for each class of multiple classes, the filter for the class; the method further comprising:
    classifying at least some pixels of the initial reconstructed frame into classes, wherein a classified pixel is associated with a respective one of the classes, and wherein generating the final reconstructed frame comprises determining the final reconstructed frame based on a corresponding filtered pixel of the filtered pixels for each classified pixel.

* * * * *